Nov. 10, 1970

J. W. HUDSON 3,539,327

METHOD FOR PREPARATION OF AMMONIUM POLYPHOSPHATE
LIQUID FERTILIZER BASE

Filed Nov. 7, 1967

INVENTOR:
JOHN W. HUDSON
BY
Carl C. Batz
ATT'Y

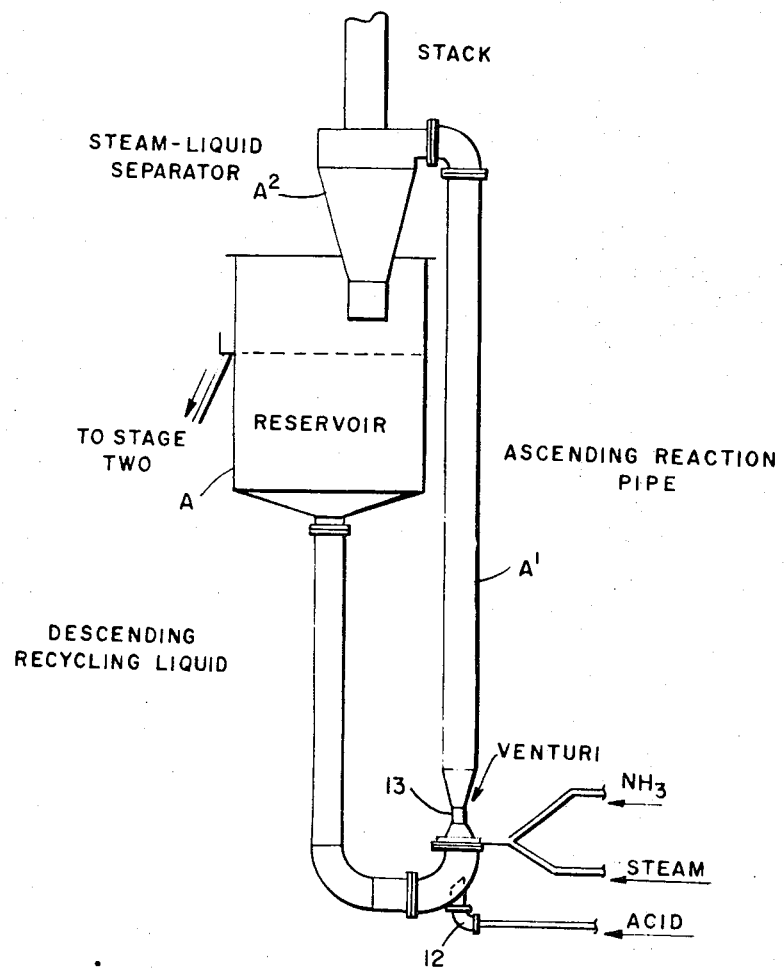

United States Patent Office 3,539,327
Patented Nov. 10, 1970

3,539,327
METHOD FOR PREPARATION OF AMMONIUM POLYPHOSPHATE LIQUID FERTILIZER BASE
John W. Hudson, Atlanta, Ga., assignor, by mesne assignments, to United States Steel Corporation, Pittsburgh, Pa., a corporation of Delaware
Continuation-in-part of application Ser. No. 596,903, Nov. 25, 1966. This application Nov. 7, 1967, Ser. No. 681,288
Int. Cl. C05b 7/00, 11/10
U.S. Cl. 71—34                    4 Claims

ABSTRACT OF THE DISCLOSURE

An ammonium polyphosphate base in prepared from wet process phosphoric acid by maintaining a first pool of ammonium polyphosphate melt from which a stream is recycled from the lower portion of the body upwardly through a generally vertical leg to above the pool, fresh wet process phosphoric acid together with ammonia and steam being introduced into the lower portion of the recycle leg, the stream being propelled upwardly during the reaction and discharged through a cyclone separator into the first pool, the steam being withdrawn from the upper part of the separator. Overflow from the first pool passes to a second pool where the melt is cooled and further reacted with ammonia and diluted with water, the product being withdrawn and mixed with a suspension clay. The fresh acid which is introduced into the bottom of the leg is preferably passed in indirect heat exchange through the second pool to preheat the acid and to cool the slurry of the second pool.

RELATED CASE

Figure 1:
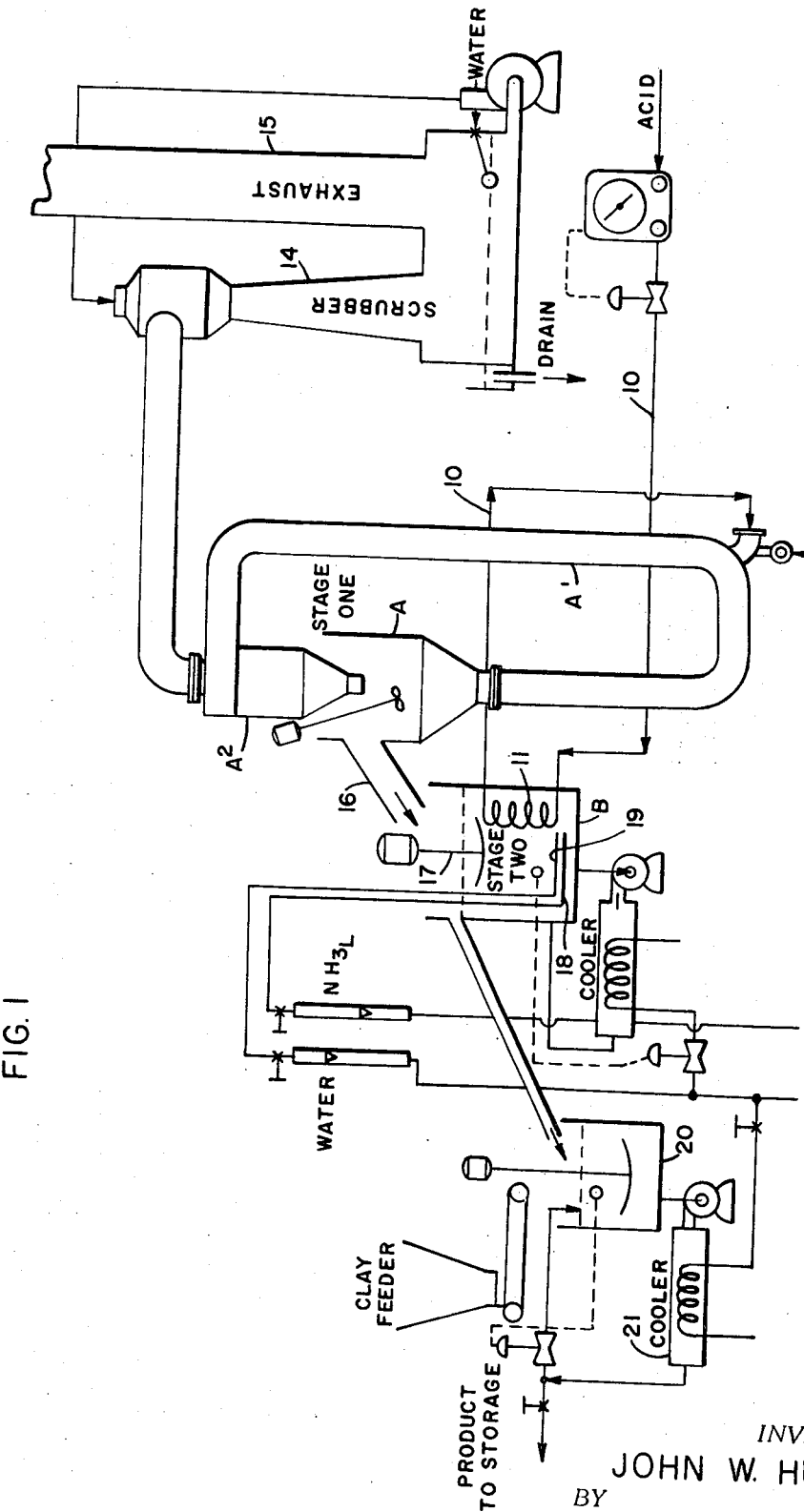

This is a continuation-in-part of my copending application Ser. No. 596,903 filed Nov. 25, 1966.

BACKGROUND AND SUMMARY

Liquid fertilizers may be classified generally as suspensions or lower-analysis complete solutions. When making liquid fertilizer mixtures, manufacturers minimize freight costs by preparing high-analysis bases from which many mixed grades can be made. Bases analyzing 11–36–0 and 12–36–0 (N-$P_2O_5$-$K_2O$) are examples of high-analysis products consisting of suspensions of fine crystals of mono- and diammonium phosphates in solutions of the same compounds. The crystals are held in suspension by the addition of small amounts of attapulgite, or other swelling-type clays.

The storage stability of suspension fertilizer bases such as 11–36–0 depends upon the incorporation of polyphosphates which minimize undesirable crystal growth during prolonged storage at ambient temperatures. The base is usually produced by ammoniating diluted superphosphoric acid—a mixture of ortho- and polyphosphate species—in a neutralizing vessel. All of the fertilizer bases derive their polyphosphate content from the superphosphoric acid. The polyphosphates are generated in wet process superphosphoric acid during high temperature dehydration of orthophosphoric acid.

Heretofore direct ammoniation of wet process phosphoric acid has been suggested to dehydrate and convert orthophosphoric acid to ammonium polyphosphate employing batchwise ammoniation of the acid under high pressure and at a slow reaction rate. Several hours of residence time are necessary, and undesirable precipitates are formed consisting of iron, aluminum and magnesium phosphate complexes that form gels when converted to mixed fertilizers. A two-stage process for the manufacture of ammonium polyphosphate has been proposed, but the product contains a prohibitively high percentage of undesirable citrate-insoluble phosphates, representing a serious, costly yield loss.

The common practice when ammoniating acid in neutralization reations is to sparge ammonia through perforated pipes underneath the surface of the liquid. The perforated pipe sparger inherently allows a high ammonia to acid ratio at the point where the ammonia leaves the pipe. Localized over-ammoniation may precipitate certain phosphates difficult to redissolve in the reactor. The undesirable complexes formed in this way generate high-viscosity gels when present in liquid fertilizers.

I have discovered that by introducing fresh wet process phosphoric acid, ammonia, and steam into a recycle stream of ammonium polyphosphate melt and then rotating the stream in a cyclone separator, it is possible to return the ammoniated body quiescently to a reservoir or pool of ammonium polyphosphate melt while allowing an overflow from the reservoir to a second ammoniation vessel where ammonia and make-up water are added to complete the ammoniation operation. The product from the second stage ammoniation may then be mixed with suspension clay. By this procedure, over-ammoniation is avoided, and the ammonium polyphosphate liquid fertilizer base is produced without converting appreciable amounts of the phosphate to unavailable citrate-insoluble compounds. The rapid circulation of the melt in stage one insures a high ratio of the melt-plus-acid to ammonia at the point where the ammonia is injected into the stream.

DRAWINGS

In the accompanying drawings, FIG. 1 is a schematic view of apparatus which may be employed in the practice of my invention; and FIG. 2, a broken side view in elevation of the recycle system employed.

DETAILED DESCRIPTION

Referring to the drawings, A designates a vessel in which a reservoir or pool of ammonium polyphosphate is maintained and $A^1$ designates a recycle leg through which ammonium polyphosphate is recycled from the lower portion of vessel A to a cyclone separator $A^2$ above vessel A; and B designates a second vessel in which stage two of the ammoniation process is carried out.

In the process, fresh wet process acid is introduced through line 10 and passes through coil 11 in the second vessel B in order to preheat the acid while at the same time cooling the overflow slurry in vessel B. The acid is introduced into the inlet 12 communicating with the bottom of the recycle leg $A^1$, as shown best in FIG. 2. There is also introduced into the leg $A^1$ and below venturi 13, a stream of ammonia together with steam, dry steam being preferred. The recycle melt from reservoir A together with the fresh wet process phosphoric acid combine with the freshly introduced ammonia and steam to form a reacting mixture and the products of the violent reaction pass upwardly through leg $A^1$ and then laterally enter tangentially the separator $A^2$. The discharged stream rotates around the zone comprising walls of the separator $A^2$ releasing steam which passes into the scrubber 14 and thence out the exhaust 15.

The steam which is fed with the ammonia dilutes the ammonia, and the large volume of injected ammonia and steam accelerates circulation of the melt in the reactor. Rapid circulation of the melt insures a high ratio of melt-plus-acid to ammonia at the point where the ammonia is injected into the reactor so that conversion of wet process orthophosphoric acid to polyphosphate acid in excess of 20 percent is obtained without precipitating undesirable insoluble solids. The dilution of the ammonia with steam (preferably dry steam) and the rapid circulation of the reaction mixture prevent local over-ammoniation which otherwise would have precipitated iron, aluminum or magnesium phosphate complexes which never redissolve completely, even in highly acid medium.

In the foregoing operation, wet process phosphoric acid, such as, for example, acid containing 54 percent $P_2O_5$ or more, is partially ammoniated in the reservoir or pool A with about 0.6–1.0 mole of ammonia for 1.0 mole of $H_3PO_4$. Liquid temperatures exceeding 360° F. are generated, dehydrating the solution, and causing at least 20 percent of the ortho to be converted to the polyphosphate form. The heat of reaction is thus utilized to convert orthophosphates to polyphosphates in sufficient quantity to stabilize fertilizer bases.

The melt formed in stage one in vessel A overflows through conduit 16 into vessel B where it is quenched, diluted, and further ammoniated. The contents of vessel B are preferably agitated by the turbine-type agitator 17. Ammonia is introduced through line 18, preferably through a perforated pipe sparger, and water is similarly introduced through line 19. The temperature of the reaction in vessel B is adjusted preferably to about 215–220° F., or to the boiling point of the contents of the vessel. Dilution water is added as necessary to replace the water boiled off and to maintain the product density preferably at about 1.410 g./ml. The liquid flowing from stage two is cooled preferably to about 180° F. and is stirred within vessel 20 where a suspension clay, such as, for example, attapulgite clay, is added. The product is cooled within cooler 21 and may then be pumped to storage.

The ammonia added in vessel B is preferably added at a rate to complement the ammonia used in vessel A and to arrive at a final product having the desired nitrogen analysis. By way of example, such a product may be 11.5–36–0.

Ammonium polyphosphate liquid fertilizer base can be produced by the above process from extremely cheap raw materials and in a continuous process without converting appreciable amounts of the phosphates to unavailable citrate-insoluble compounds. The use of steam and the high recirculation rate prevent localized over-ammoniation which would otherwise result in increased precipitation of solids. Keeping the metal complexes from forming while producing the base yields mixed fertilizers of high fluidity that do not thicken on prolonged storage.

Specific examples illustrative of the invention may be set out as follows:

EXAMPLE I

Wet process phosphoric acid containing 54 percent $P_2O_5$ was fed to the bottom of the ascending pipe or leg $A^1$, as shown in the drawings. Ammonia and steam were fed through a venturi injector at a point just above the acid entrance in the ascending pipe. The ascending pipe acted as the reaction and pumping zone. The reaction and the force of the injected ammonia/steam mixture accelerated movement of the recirculating solution up the reaction pipe. The ascending reaction pipe turned 90° at the top and discharged into the cyclone. The steam exhausted through the stack and the liquid fell quietly into the reservoir. Liquid in the reservoir was stirred vigorously to insure uniform mixing of the components. Some liquid flowed down through the descending pipe and then through the horizontal connector to the ascending reaction pipe. The recycling liquid picked up the incoming acid, diluting and mixing with it before passing into the venturi injector where the acid and ammonia began to react. The violently-reacting materials formed steam and the steam formed bubbles which entrained the liquid, forcing it upward and reducing the density of the liquid. Liquid in the reservoir rushed downward to replace the less dense rising liquid in the vertical reaction pipe. The sum of the several movements formed a continuous process that continually provided a high ratio of liquid surface to ammonia. The temperature in the reservoir was controlled at 360° F. by adjusting the mole ratio of the ammonia to the acid, or by adjusting the temperature of the preheated acid. Acid feed for stage one was preheated to 200° F. by coils submerged in the reaction zone of stage two. Acid could bypass the preheated coils as necessary to adjust the heat content. The hot melt overflowed stage one as it was formed, and flowed into stage two (vessel B).

As the hot melt (analyzing about 8–59–0) flowed into stage two, it was quenched, diluted and further ammoniated to yield a product analyzing 11.5–36–0, with a density of 1.410 g./ml. and a pH of about 6.1–6.5.

The temperature of the reaction mixture was adjusted to 215° F. Dilution water was added to replace the water boiled off and to maintain the product density at 1.410 g./ml. The liquid from stage two (vessel B) was cooled to 180° F. and then mixed with attapulgite clay. The final product had the analysis of 11.5–36–0.

EXAMPLE II

The process was carried out as described in Example I in run 1 and run 2, and the conditions and results of the runs are set out in the following table:

TABLE I

| | Run 1 | Run 2 |
|---|---|---|
| Production rate, lb./hr | 300 | 300 |
| Stage 1: | | |
| Phosphoric acid feed, rate, lb./min | 3.3 | 3.3 |
| Phosphoric acid, percent $P_2O_5$ | 54.56 | 54.56 |
| Temperature of feed acid, °F | 204 | 200 |
| Vaporized ammonia flow, lb./min | .31 | .31 |
| Mole ratio, $NH_3/H_3PO_4$ | 0.7 | 0.7 |
| $NH_3$ Temperature, °F | 80 | 80 |
| Reservoir temperature, °F | 370 | 360 |
| Exhaust vapor temperature, °F | 365 | 355 |
| Stage 2: | | |
| Ammonium vapor, lb./mi | 3.92 | 3.92 |
| Dilution water, lb. min | 1.87 | 1.87 |
| Reaction temperature, °F | 213 | 213 |
| Clay stage: | | |
| Attapulgite added, percent | 3 | 3 |
| Temperature, °F | 170–180 | 170–180 |
| Product analysis: | | |
| Specific gravity, g./cc | 1.425 | 1.429 |
| pH | 6.35 | 6.18 |
| Nitrogen, percent | 11.12 | 11.07 |
| Phosphate, percent $P_2O_5$, total | 36.24 | 36.46 |
| Ortho | 28.58 | 27.96 |
| Citrate-insoluble | .19 | .51 |
| Water-soluble | 33.91 | 33.90 |
| Conversion to polyphosphate, percent | 21.1 | 23.2 |

While in the foregoing specification I have set out the process and apparatus in considerable detail for the purpose of illustrating the invention, it will be understood that such structure and procedure may be varied widely by those skilled in the art without departing from the spirit of my invention.

What is claimed is:

1. The method of preparing ammonium polyphosphate from wet process phospheric acid, comprising
    (a) maintaining a first reservoir of a molten mixture of ammonium polyphosphate and ammonium orthophosphate such that the polyphosphate content in the melt is at least about 20%;
    (b) recycling said molten polyphosphate mixture from the lower portion of said reservoir in an upwardly-flowing stream in a conduit reaction zone to above said reservoir;
    (c) introducing into said stream wet process phospheric acid of at least about 54% $P_2O_5$ content at a point below but proximate to a venturi at the bottom of said conduit reaction zone;
    (d) introducing at a point above the phosphoric acid introduction point but below said venturi
        (1) steam, and
        (2) ammonia in an amount such that the $NH_3$: $PO_4$ ratio is about 0.6–1.0 mole of ammonia per mole of $H_3PO_4$;
    under conditions affording a temperature in excess of 360° F. which dehydrates the mixture;

(e) separating steam from said molten polyphosphate mixture stream in a zone above said reservoir,
(f) discharging said stream into said reservoir;
(g) passing molten polyphosphate mixture from the upper portion of said first reservoir into a second reservoir of ammonium polyphosphate slurry;
(h) cooling said slurry to its boiling point;
(i) introducing ammonia and water into said second reservoir to obtain the desired nitrogen analysis in said ammonium polyphosphate; and
(j) withdrawing the said slurry from the said second reservoir.

2. The process of claim 1 in which said introduced steam is dry steam.

3. The process of claim 1 in which said wet process phosphoric acid before introduction into said upwardly-flowing stream is first passed in heat-exchange relation with said second reservoir to preheat said wet process phospheric acid.

4. The process of claim 1 in which the slurry withdrawn from said second reservoir is mixed with suspension clay.

References Cited
UNITED STATES PATENTS

| | | | |
|---|---|---|---|
| 2,890,935 | 6/1959 | Lloyd | 23—107 XR |
| 2,902,342 | 9/1959 | Kerley | 71—43 |
| 3,019,099 | 1/1962 | Walters | 71—34 |
| 3,130,033 | 4/1964 | Stephens | 71—1 |
| 3,179,496 | 4/1965 | Skinner et al. | 71—43 XR |
| 3,310,371 | 3/1967 | Lutz | 71—43 XR |
| 3,375,063 | 8/1968 | Bookey et al. | 23—107 |

REUBEN FRIEDMAN, Primary Examiner

B. H. LEVENSON, Assistant Examiner

U.S. Cl. X.R.

23—107; 71—43, 64